United States Patent Office 2,881,083
Patented Apr. 7, 1959

2,881,083

REFRACTORY BRICK AND METHOD OF MAKING

John H. Veale, Joliet, Ill., assignor to Illinois Clay Products Company, Joliet, Ill., a corporation of Illinois No Drawing. Application October 4, 1956
Serial No. 613,836

8 Claims. (Cl. 106—67)

This invention relates to a method of making a brick, as for example, a ladle brick for use in steel mills. More particularly, it relates to a step of adding a compound to a green clay brick mix which substantially eliminates the oxidation holding period of brickmaking.

Setting the background, clay bricks are processed after forming in two steps. The first is the drying step and consists of drying the green brick at temperatures between 180°–212° F. for periods up to five days in order to release mechanically held water. The burning operation consists of four steps, namely water smoking, oxidation, vitrification, and cooling.

A typical tunnel kiln burning schedule for a fire clay maturing at cone 6 is as follows:

| | Hours |
|---|---|
| Water smoking, 212° F. to 932° F. | 7 |
| Oxidation, 932° F. to 1800° F. | 28 |
| Vitrification, 1800° F. to 2100° F. | 18 |
| Cooling, 2100° F. to 70° F. | 17 |
| Total | 70 |

At approximately 932° F. the chemically combined water is removed and the period from 212° F. up to this temperature is designated as the water smoking period, although in the trade sometimes the entire period of water removal including the drying period is known as the water smoking period. Also it will be understood that there will be some overlapping of the various periods.

The oxidation of carbon starts as low as 500° F. but the greater part of oxidation takes place between 900° F. and 1800° F. This firing schedule is used on a clay containing 1% carbon and 1% sulphur. During the oxidation period the carbon and sulphur oxidize and liberate gaseous products such as CO, $CO_2$, $SO_2$ and $SO_3$. The gaseous products must be evolved before vitrification begins or the pressure of the escaping gases will cause bloating and swelling of the brick.

The principal object of this invention is to eliminate the oxidation step, while still producing an unbloated and well shaped brick. The long oxidation holding period of the conventional refractory brickmaking process is necessary in order to prevent the formation of gases within the brick at a rate of speed so great that they bloat the brick. At temperatures between approximately 900–1800° F., carbon and sulphur oxides in gas form are generated within the brick at a rate such that they may escape through the pores of the brick. If the heating were raised abruptly to the burning temperature of 2100° F., as the applicant proposes to do, the bricks would bloat and become misshaped and could not be used. As will hereinafter appear, applicant's process is complete in a 40- to 44-hour cycle, and the product is a well shaped brick.

The feature of this invention which enables the applicant to attain this general object is the addition to the clay before pressing into brick of a metal reducing agent which on a rising temperature has a rate of combining with oxygen such that throughout the period of heating and exposure to oxygen, the oxygen instead of combining exclusively with the carbon and sulphur impurities in the brick and thereby forming rapidly expanding gases, combines with the elements of the added compound to form high oxygen containing solid compounds. A compound which accomplishes this purpose is ferrophosphorus. Another suitable compound is ferrosilicon. Aluminum powder likewise is satisfactory for applicant's purpose. Ferrochrome, ferromanganese, and iron powder gave some improvement over no additive but were far inferior to ferrophosphorus and aluminum powder. Ferrosilicon was intermediate in value. The ferrophosphorus or like metal reducing agent can be mixed in powdered form into the plastic wet clay composition if a stiff mud process is to be used in making brick, or it can be added during the mixing of the dry clay if a dry press process is to be used.

It has been found that as little as one-half percent by weight of ferrophosphorus in the clay composition is effective to stop bloating or warping of bricks made by a process which eliminates the normal oxidation period. Suitable and effective proportions are from ½% to 2½% ferrophosphorus. More than 2½% ferrophosphorus can be used but the additional amount appears to have no appreciable effect on preventing warping. The other metal reducing agents are effective as indicated in approximately the same proportions.

The clay can contain sulphur and/or carbon. In general, the amount of one or both should be less than 5% by weight of the composition and will be present in clays useful in the application of this invention in amounts of above .3%.

Before further generalizing, the applicant will present an example.

EXAMPLE I

A kaolin type clay containing approximately 1.2% by weight of sulphur, 1% by weight of carbon, and 2½% by weight of $Fe_2O_3$ was first crushed so that 100% would pass through an 8-mesh screen, and 50% would be retained on a 28-mesh screen. This material was thoroughly mixed together and during the mixing 1.5% by weight of ferrophosphorus was added and mixed into the composition. The ferrophosphorus was added and mixed into the composition. The ferrophosphorus had a particle size such that substantially all would pass through an 80-mesh screen. This composition was dry pressed into brick form.

The brick was then dried at a temperature of 180–212° F. for five days, during which substantially all mechanically held moisture was removed.

The dried brick were then stacked on a bench which was moved into a tunnel kiln and for fourteen hours, the temperature was raised steadily to 2100° F. This is the burning temperature and the bricks were held at approximately this temperature for ten hours.

Thereupon, the bench of brick moved into zones of steadily declining temperatures so as to cool the brick, this occurring over a period of about sixteen hours.

The resultant brick had a modulus of rupture of 2200 p.s.i. which is to be compared with a modulus of rupture of 1100 p.s.i. of the standard ladle brick which applicant's assignee has been supplying to the trade for years and which is accepted in the trade as the standard strength. It should be said parenthetically that strength is an unimportant consideration in ladle brick, and hence this superiority is not important. However, strength is important in shipping, as stronger brick ship without damage to edges and corners.

The finished brick had a greater density with a corresponding lower porosity. The superiority in density should improve the life, but the principal value at the moment is seen in obtaining an equally good brick during much less time.

Composition tests show that the brick contains .27% of sulphur whereas the sulphur content was completely eliminated in the brick heretofore supplied. These composition analyses were made at the University of Illinois, and established that oxidation of the sulphur to the gaseous state was greatly inhibited by the addition of ferrophosphorus. The form of the sulphur in the final composition is not clear. The analyses also showed ferric oxide and aluminum phosphates in fractions of one percent. The percentage of carbon remaining in the brick was not checked.

Following are the properties of applicant's regular burned ladle brick and the same brick with a 2% ferrophosphorus addition:

|  | Regular (center section) | FeP brick (center section) |
|---|---|---|
| $Fe_2O_3$ | 2.02 | 1.22 |
| FeO | .04 | 2.00 |
| $P_2O_5$ | <.002 | .92 |
| Sulphur | none | .27 |
| Porosity percent | 17 | 16 |
| Modulus of rupture, p.s.i. | 1,100 | 1,900 |
| Density, oz./cu. in. | 1.24 | 1.26 |

With the foregoing in mind, the specific object of applicant's invention is to slow down the formation of carbon and sulphur oxides especially during the steady and comparatively fast rise to the burning temperatures of 2100° F. in an oxidizing atmosphere. This is done by using a substantial portion of the available oxygen to form solid oxides within the brick, thereby providing a limited amount of oxygen at any given moment to combine with carbon or sulphur to form a gas.

The process was also carried out for other percentages of ferrophosphorus. The following table shows the results of laboratory tests made on clay composition so made:

Table I

| Mix number | 560 | 561 | 562 | 563 |
|---|---|---|---|---|
| Percent raw clay | 100 | 100 | 100 | 100 |
| Percent ferrophosphorus | 0 | 1 | 2 | 3 |
| Dry density, oz./cu. in. | 1.29 | 1.30 | 1.32 | 1.33 |
| Percent linear shrinkage | 2.3 | 1.8 | 1.25 | .75 |
| Percent ignition loss | 6.65 | 6.0 | 5.35 | 4.65 |
| Density, oz./cu. in. | 1.30 | 1.29 | 1.29 | 1.30 |
| Modulus of rupture, p.s.i. | 2,010 | 2,400 | 2,700 | 3,000 |

The ferrophosphorus additions definitely have the following effects:

(1) Lower burning shrinkage
(2) Lower ignition loss
(3) Substantial saving in time and fuel costs There is no change in density and an increase in strength. Due to the lower burning shrinkage, one might expect a lower density but this is offset by a lower ignition loss.

Two small sample lots of brick have been burned in the plant using 2.5% of ferrophosphorus. One lot was set with the standard setting clearance between brick, while the other lot was set face-to-face with no air space.

Both lots came out with no evidence of warpage or cracks. The outer surface was a dark tan, while the inside was brown in the first lot and brown and black in the second lot.

Example I was repeated substituting powdered aluminum for ferrophosphorus. The results were substantially the same.

The nature of the action of ferrophosphorus on the clay is not entirely understood. It is believed, however, that the ferrophosphorus reacts with the oxygen of the air in the pores of the shaped clay article so that this oxygen is not available to react with the sulphur or carbon. The ferrophosphorus reacts with the oxygen to form FeO or $Fe_2O_3 + P_2O_5$, the $P_2O_5$ reacting further with the clay to form aluminum phosphate.

It is to be understood that the scope of the invention is not intended to be limited to the specific procedures, proportions of ingredients, and other particulars which have been set forth in the foregoing, which have been given by way of illustrating the principle of the invention. For a definition of the scope of the invention, reference is made to the appended claims.

Having thus described his invention, what applicant claims is:

1. The method of making brick from clay containing an oxidizable impurity of the group consisting of sulphur and carbon which comprises mixing a powdered metal of the group consisting of ferrophosphorus, ferrosilicon and aluminum in the clay in an amount of approximately ½% to 2½% by weight of the clay composition, shaping the composition in the form of a brick and then raising the temperature of the brick to its firing temperature without allowing any substantial waiting period of time for oxidation.

2. The method of claim 1 wherein the powdered metal is ferrophosphorus.

3. The method of claim 1 wherein the powdered metal is ferrosilicon.

4. The method of claim 1 wherein the powdered metal is aluminum.

5. A composition suitable for making brick consisting essentially of clay, from about .3% to 5% by weight of an impurity from the group consisting of sulphur and carbon, and from about ½% to 2½% by weight of a powdered metal from the group consisting of ferrophosphorus, ferrosilicon and aluminum.

6. A composition suitable for making brick consisting essentially of clay, from about .3% to 5% by weight of an impurity from the group consisting of sulphur and carbon, and ferrophosphorus from about ½% to 2½% by weight.

7. A composition suitable for making brick consisting essentially of clay, from about .3% to 5% by weight of an impurity from the group consisting of sulphur and carbon, and ferrosilicon from about ½% to 2½% by weight.

8. A composition suitable for making brick consisting essentially of clay, from about .3% to 5% by weight of an impurity from the group consisting of sulphur and carbon, and aluminum from about ½% to 2½% by weight.

References Cited in the file of this patent

UNITED STATES PATENTS 1,585,826    Betts _____ May 25, 1926

OTHER REFERENCES

Ries: Economic Geology, 5th edition (New York, 1925), pp. 174 and 175.